US006837488B2

(12) United States Patent
Kobayashi et al.

(10) Patent No.: US 6,837,488 B2
(45) Date of Patent: Jan. 4, 2005

(54) DOCUMENT FEEDING APPARATUS AND DOCUMENT READING APPARATUS

(75) Inventors: Atsumi Kobayashi, Yamanashi-ken (JP); Kunihide Suzuki, Kofu (JP); Yutaka Tanaka, Yamanashi-ken (JP); Akiharu Higaki, Yamanashi (JP); Akihiko Tukui, Yamanashi-ken (JP); Mizuho Shirakura, Yamanashi-ken (JP)

(73) Assignee: Nisca Corporation, Yamanashi-ken (JP)

( * ) Notice: Subject to any disclaimer, the term of this patent is extended or adjusted under 35 U.S.C. 154(b) by 0 days.

(21) Appl. No.: 10/162,711

(22) Filed: Jun. 6, 2002

(65) Prior Publication Data

US 2003/0011121 A1 Jan. 16, 2003

(30) Foreign Application Priority Data

Jun. 12, 2001 (JP) ........................................ 2001-177009

(51) Int. Cl.[7] ............................................. B65H 85/00
(52) U.S. Cl. ..................................... 271/3.14; 271/4.01
(58) Field of Search ............................. 271/3.14, 4.01, 271/3.01, 4.04, 3.08, 6, 4.05, 4.06, 4.07, 4.08, 4.09, 4.1

(56) References Cited

U.S. PATENT DOCUMENTS

| 5,127,642 A | * | 7/1992 | Takimoto et al. | ........... 271/3.19 |
| 5,584,473 A | * | 12/1996 | Baba | ................. 271/3.18 |
| 6,062,559 A | * | 5/2000 | Tanjo et al. | ............... 271/225 |
| 6,145,827 A | * | 11/2000 | Harada et al. | ............. 271/3.01 |

FOREIGN PATENT DOCUMENTS

| JP | 63218439 A | * | 9/1988 | ............ B65H/1/30 |
| JP | 01285546 A | * | 11/1989 | ............ B65H/7/02 |
| JP | 04032444 A | * | 2/1992 | ............ B65H/9/14 |
| JP | 04129950 A | * | 4/1992 | ............ B65H/7/02 |
| JP | 05000774 A | * | 1/1993 | ........... B65H/85/00 |
| JP | 05024719 A | * | 2/1993 | ............ B65H/9/00 |

OTHER PUBLICATIONS

Patent Abstract of Japan, No. 62105837, publication date May 16, 1987, Canon Inc., Omron, Tateisi Electric Co..
Patent Abstract of Japan, No. 02215666, publication date Aug. 28, 1990, Applicant Konica Corp..

* cited by examiner

*Primary Examiner*—Donald P. Walsh
*Assistant Examiner*—Matthew J. Kohner
(74) *Attorney, Agent, or Firm*—Manabu Kanesaka

(57) ABSTRACT

The document feeder apparatus is equipped with a sheet supply unit including a sheet supply member for supplying an original to a reading position; a transport unit including a transport member for receiving the original from the sheet supply member and transporting the original to the reading position; a discharge unit including a discharge member for discharging the original read at the reading position; and a flat plate shape support frame for supporting the respective units. The sheet supply unit and discharge unit are mounted on one of front and rear sides of the support frame, and the transport unit is mounted on the other of the front and rear sides of the support frame, so that each unit is unitized. Further, a sheet supply opening for guiding the original from the sheet supply unit to the transport unit is established on one side of the support frame, and an opening for guiding the original from the transport unit to the discharge unit is established on the other side of the support frame.

15 Claims, 14 Drawing Sheets

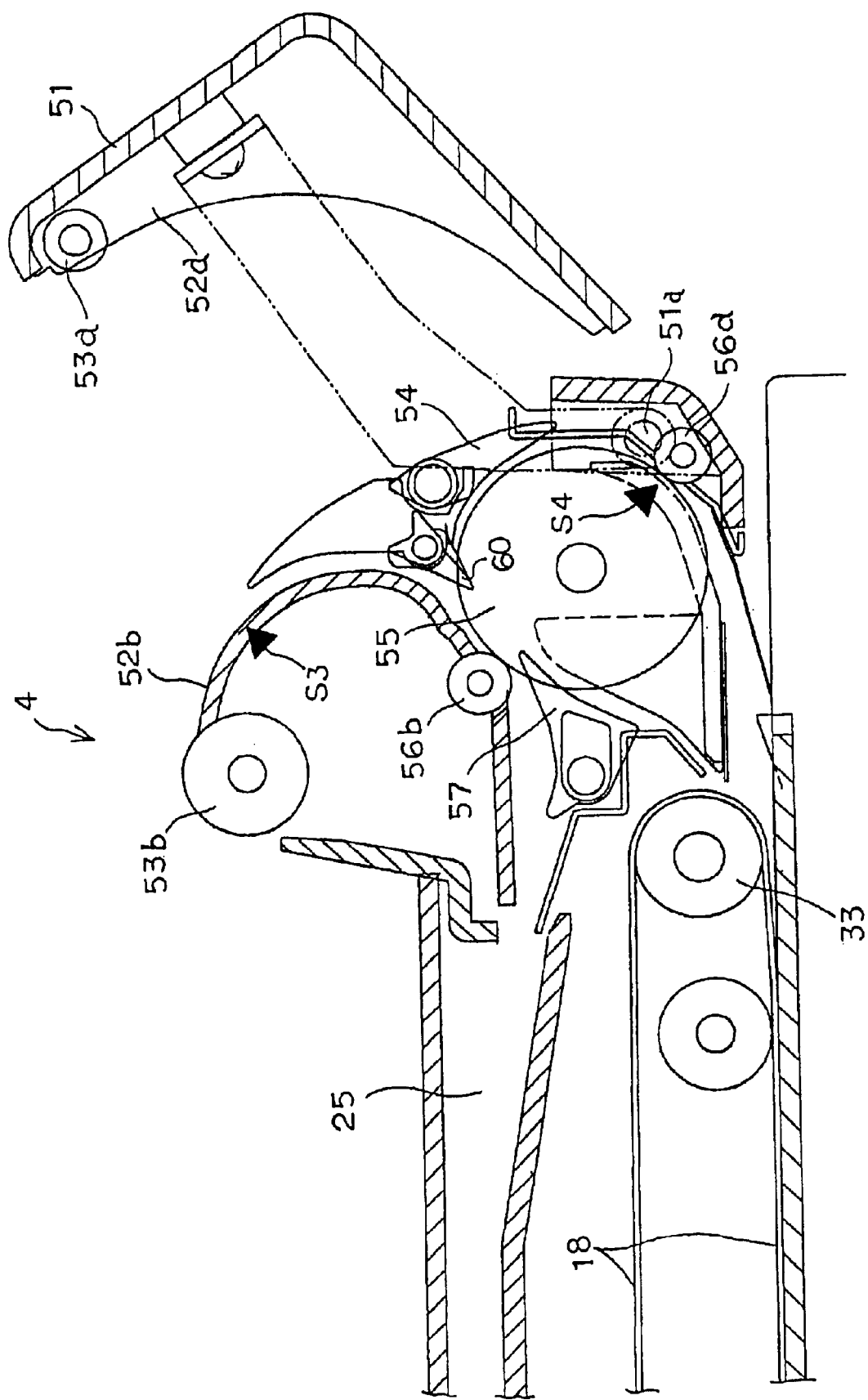

DOCUMENT FEEDING APPARATUS AND DOCUMENT READING APPARATUS

BACKGROUND OF THE INVENTION

This invention relates to an automatic document feeder for supplying, transporting and discharging an original relative to a predetermined position and an image forming apparatus equipped with the automatic document feeder. More particularly, this invention relates to a structure for unitizing sheet supply, transport and discharge mechanisms in an automatic document feeder.

An automatic document feeder mounted on an image reading apparatus is provided with a sheet supply mechanism formed of sheet supply rollers and register rollers for drawing out an original stacked on a sheet supply tray; a transport mechanism having a transport belt for placing the original drawn from the sheet supply mechanism on a platen glass of an image forming apparatus; a discharge mechanism including discharge rollers for discharging the original with an image thereupon read from the transport mechanism to a discharge tray; and a guide for guiding the original. These mechanisms are mounted on a pair of side plates and unitized, and an outer cover covers the unit.

In such a configuration, however, since a large number of parts such as the various rollers and guides are separately mounted on a pair of the side plates, the structure of the apparatus becomes more complex, and the number of assembly steps increases.

Furthermore, the guide mounted to straddle a pair of the side plates is formed of a rigid metallic material to maintain strength of the apparatus, thus an overall weight of the apparatus becomes heavier, creating a problem of poor operability.

On the other hand, as disclosed in Japanese Patent Publication (Tokkai) No. 06-598 or Japanese Patent No. 2939621, in order to have a structure in which an assembly operation is improved, sheet supply, transport and discharge mechanisms are separately unitized and mounted on an outer cover from under the cover, thereby forming a unitized structure with the outer cover as an apparatus frame.

In the apparatus having such a unitized structure, however, since the outer cover is made of a plastic, the apparatus lacks sufficient strength thereof, resulting in a problem of causing deformation of the apparatus itself.

To increase the strength of the apparatus, it is possible to mount a support member, such as a metallic stay, on several locations in the outer cover of the apparatus as reinforcement. However, mounting the support members leads to an increase in an overall weight of the apparatus, preventing reduction in the apparatus weight.

Furthermore, in such a configuration, because the sheet supply, transport and discharge mechanisms are mounted on the outer cover and are unitized, each unit must be removed from the bottom side of the apparatus for maintenance of each part, thereby making the removal work troublesome.

In view of the aforementioned problems, an object of the present invention is to provide an automatic document feeder with a simplified structure to reduce the number of assembly parts, in addition, to provide a lighter and rigid structure.

SUMMARY OF THE INVENTION

According to this invention, a sheet supply unit and a discharge unit are mounted on one side of a back and front surfaces of a flat plate-shaped support frame, and a transport unit is mounted on the other side of the front and back surfaces. Each of the units is linked to unitize, so that an apparatus is lighter, more easily assembled, and maintenance is improved.

Furthermore, the flat plate-shaped support frame is provided with a mounting portion of each unit by bending, so that the rigidity thereof is increased, thereby increasing the strength of the apparatus and subsequently improving precision of the unit mounting.

Also, it is configured that the flat plate-shaped support frame of the automatic document feeder and a frame of the image reading apparatus are linked with a hinge device, so that the automatic document feeder can rotate relative to the image reading apparatus. Thus, the image reading apparatus will not deform due to a load of the automatic document feeder.

BRIEF DESCRIPTION OF THE DRAWINGS

FIG. 7 is a sectional view showing a state that a discharge supply unit of the present invention opens;

DETAILED DESCRIPTION OF PREFERRED EMBODIMENTS

Hereunder, embodiments of an automatic document feeder apparatus according to the present invention will be explained in detail with reference to the accompanied drawings.

Figure 1:
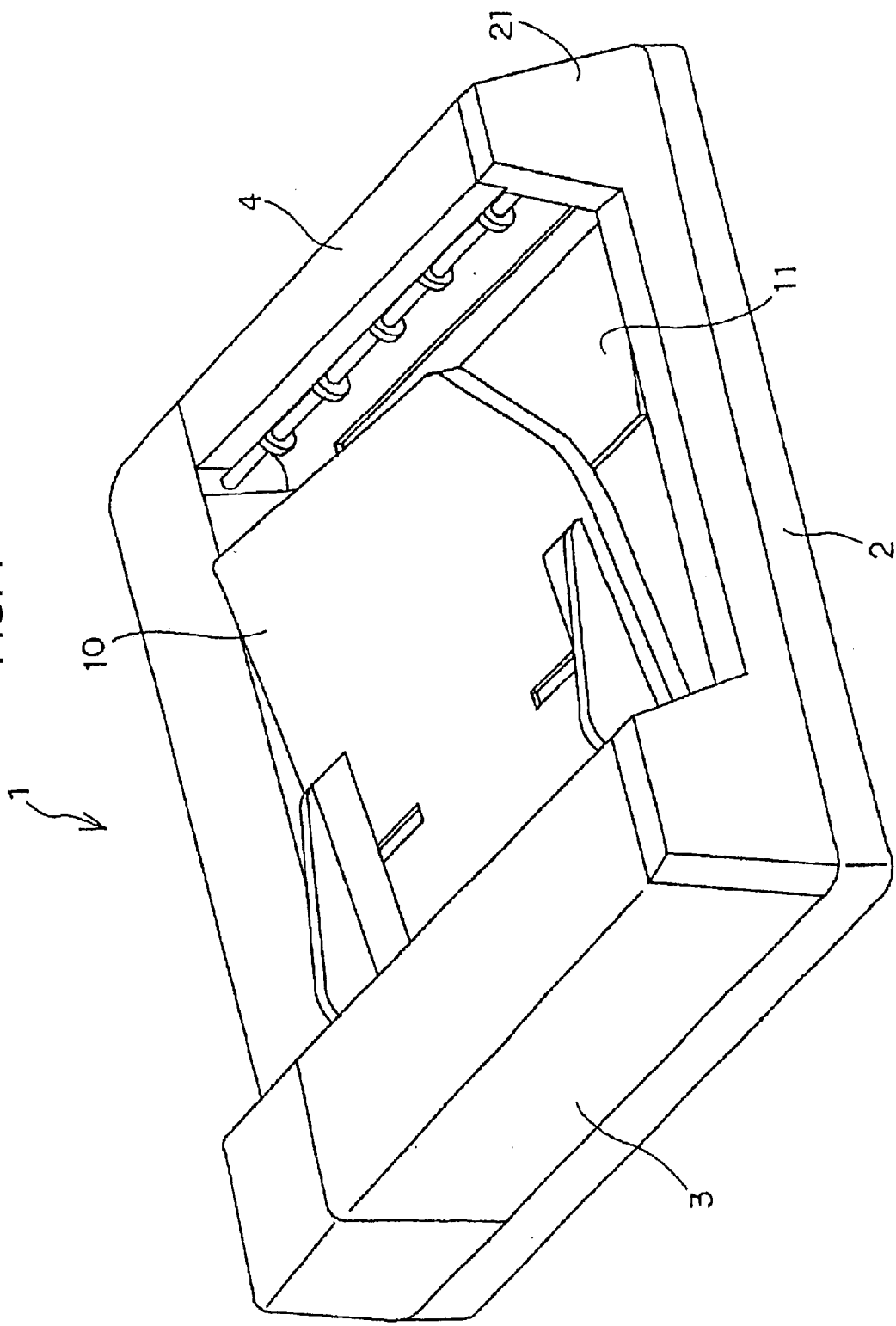
FIG. 1 is a perspective view showing an image reading apparatus equipped with an automatic document feeder apparatus according to the present invention.
Figure 2:
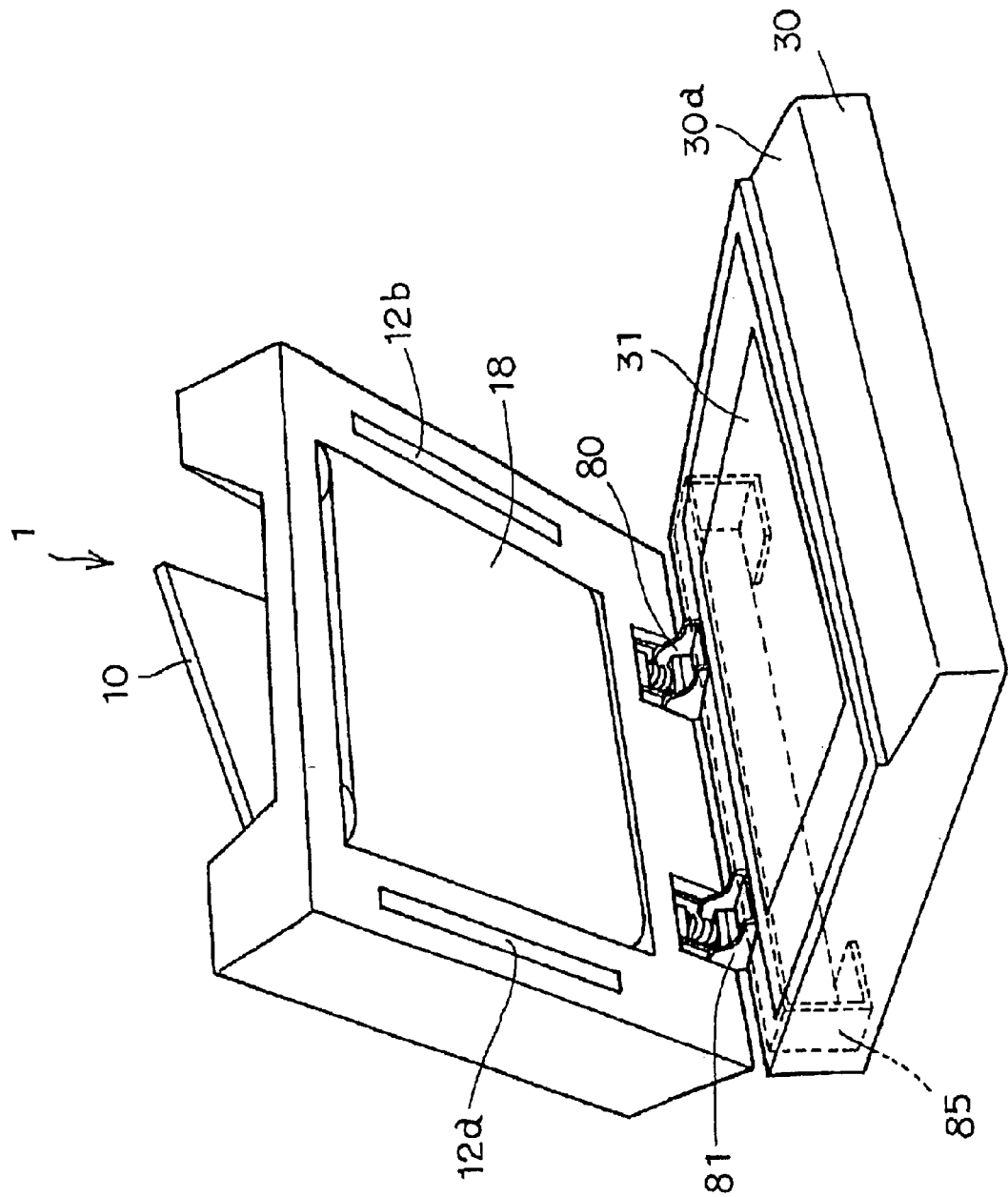
FIG. 2 is a perspective view showing a state that the automatic document feeder apparatus opens and closes with respect to the image reading apparatus according to the present invention.
Figure 3:
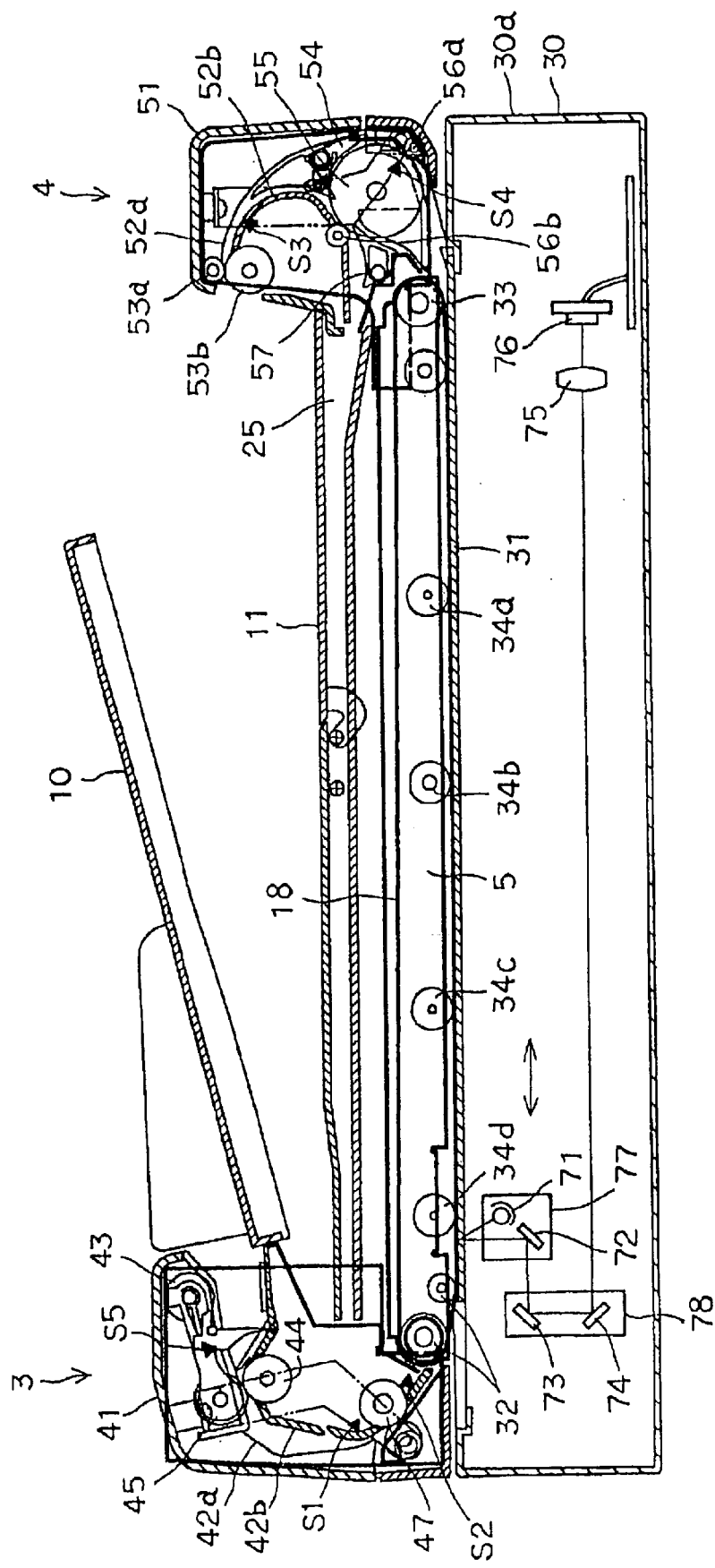
FIG. 3 is a sectional view of the image reading apparatus equipped with the automatic document feeder apparatus according to the present invention.
Figure 4:
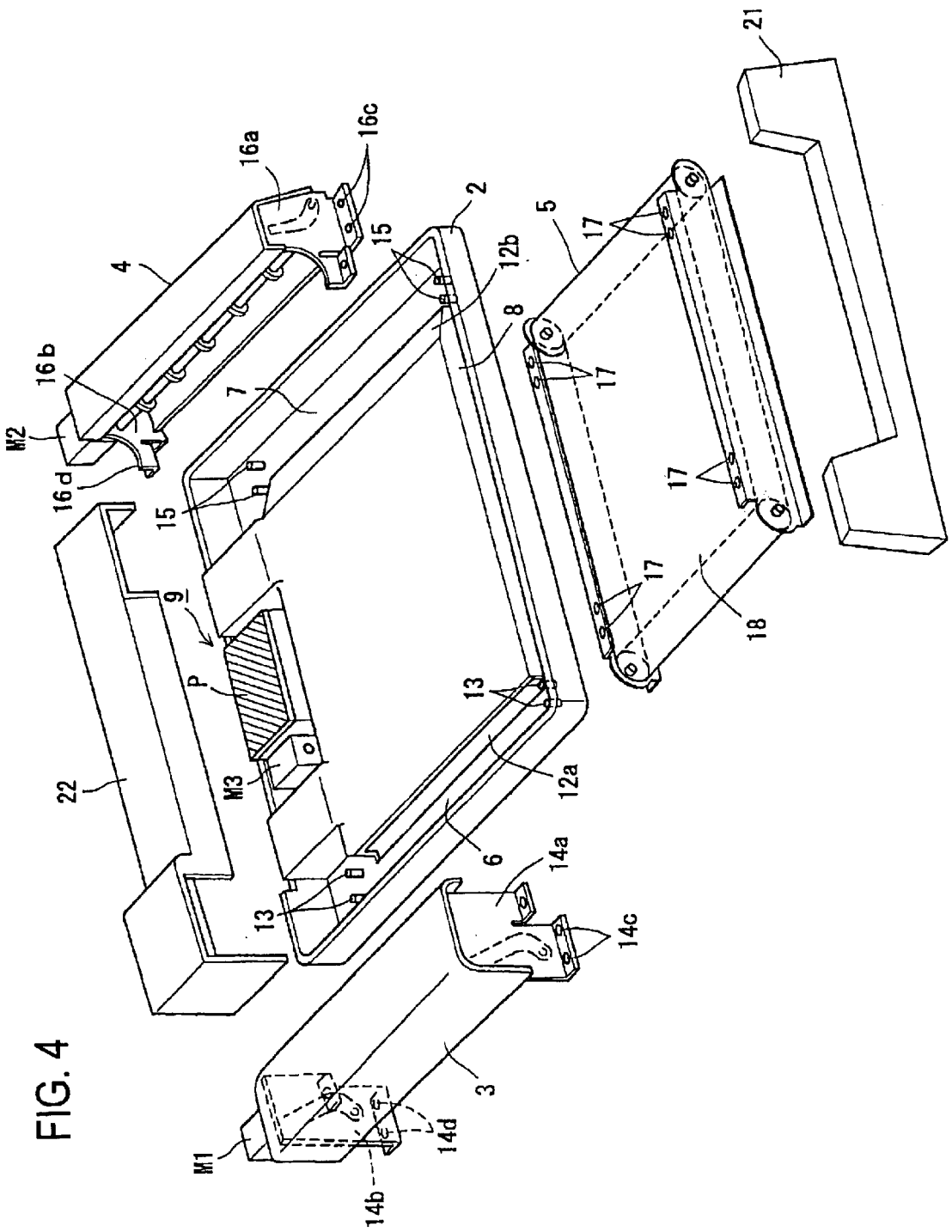
FIG. 4 is an exploded view showing essential units of the automatic document feeder apparatus according to the present invention.

FIG. 1 is a perspective view showing an image reading apparatus 30 equipped with an automatic document feeder apparatus 1. FIG. 2 is a perspective view showing a state that the automatic document feeder apparatus 1 opens and closes with respect to the image reading apparatus 30. FIG. 3 is a sectional view of the image reading apparatus equipped with the automatic document feeder apparatus. FIG. 4 is an exploded view showing essential units of the automatic document feeder apparatus.

As can be seen in FIG. 1, FIG. 2 and FIG. 3, the image reading apparatus 30 is equipped with a platen glass 31 for placing an original, the first carriage 77 for reading the original placed on the platen glass 31, the second carriage 78, a lens 75 and a CCD (Charge Coupled Device) substrate provided with a CCD 76.

Also, the first carriage 77, the second carriage 78, and the CCD substrate including the lens 75 and the CCD 76 are mounted on a frame 85 in a apparatus housing 30a that is formed of a plastic, as shown in FIG. 2. The frame 85 is made of a rigid metallic member to increase strength of the image reading apparatus 30.

In describing the image reading apparatus 30 in more detail, the light source 71 disposed in the first carriage 77 irradiates light to the original placed on the platen glass 31 mounted on the outer cover 30a. The light reflected from the original passes through an aperture portion in the first carriage 77, and the light path is deflected in a sub-scanning direction by the first mirror 72. An image on the original, whose light path has been deflected, is deflected downward by the second mirror 73 on the second carriage 78, and is then deflected in a direction toward a lens 75 by the third mirror 74. The CCD 76 mounted to the CCD substrate converts the image collected in the lens 75 to an electrical signal. Then, the image converted to the electrical signal at the CCD 76 is processed by an image processing circuit on a control board (not shown in the drawings)

It is structured that the first carriage 77 moves in a sub-scan direction at twice the speed of that of the second carriage 78, so that the light path passing via the three mirrors of 72, 73 and 74 from the original surface to the lens 75 is maintained to be always the same.

In describing the automatic document feeder apparatus 1, as shown in FIG. 1 to FIG. 3, the automatic document feeder apparatus 1 is provided with a sheet supply tray 10 for stacking the original; a discharge tray 11 for storing the original that of is read; the flat plate-shaped support frame 2 formed of a plastic; a sheet supply unit 3 arranged on one end of the support frame 2 for drawing out the original placed on the sheet supply tray 10; a transport unit 5 for receiving the original drawn from the sheet supply unit 3 and transporting the original to a predetermined position on a platen top 31 of the reading apparatus 30 located below; and a discharge unit 4 arranged on the other side of the support frame 2 to the discharge tray 11 for discharging the original after reading the image.

Also, a front cover 21 and a rear cover 22 are mounted to front and rear sides of the apparatus. The front cover 21 and the rear cover 22 can be separated and arranged to form with the sheet supply unit 3 and the discharge unit 4, or can be integrated with the support frame 2.

The automatic document feeder apparatus 1 is mounted to the image reading apparatus 30 to freely rotate using a hinge device 80, as can be seen in FIG. 2.

Figure 5:
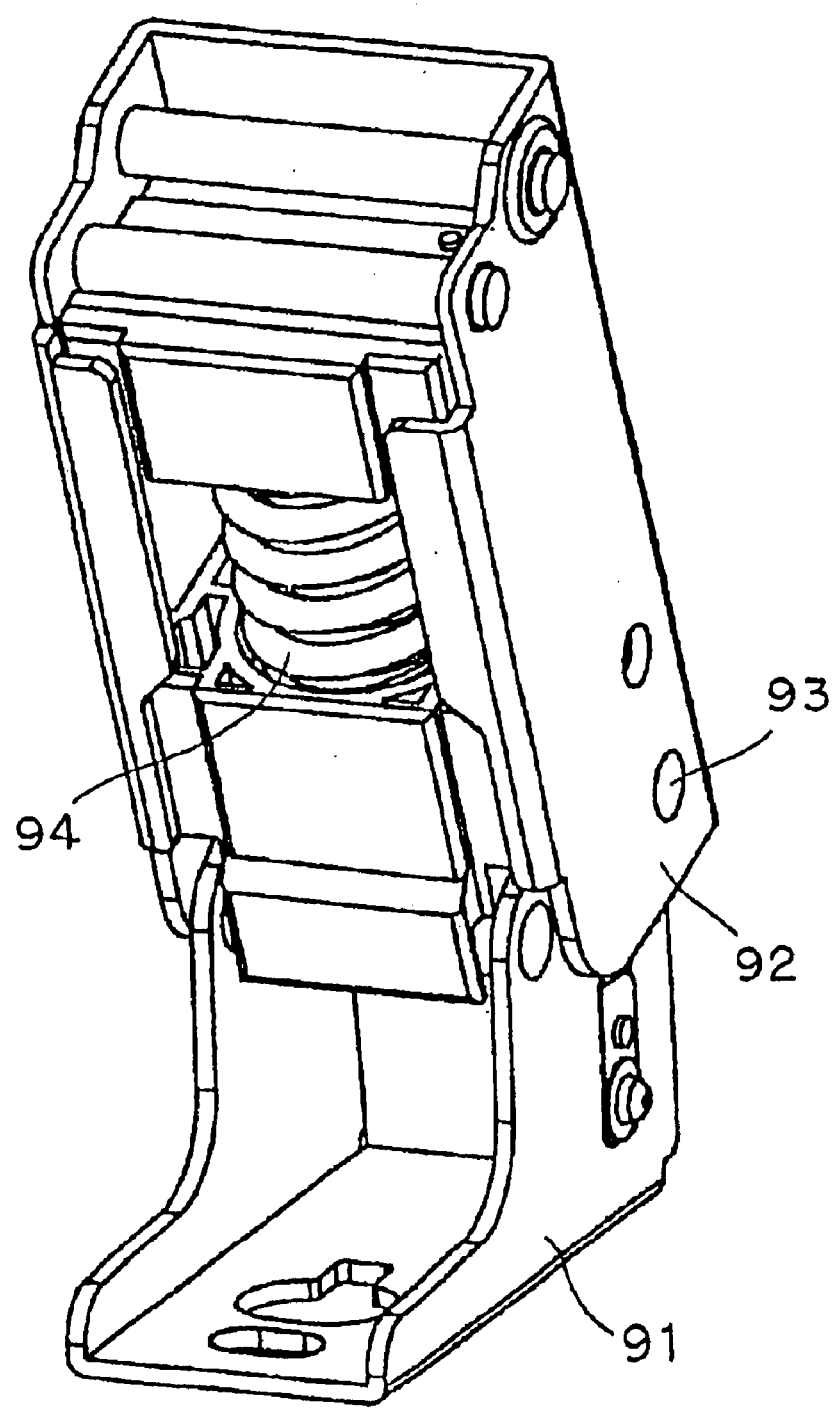
FIG. 5 is a perspective view showing a hinge device according to the present invention.
Figure 6:
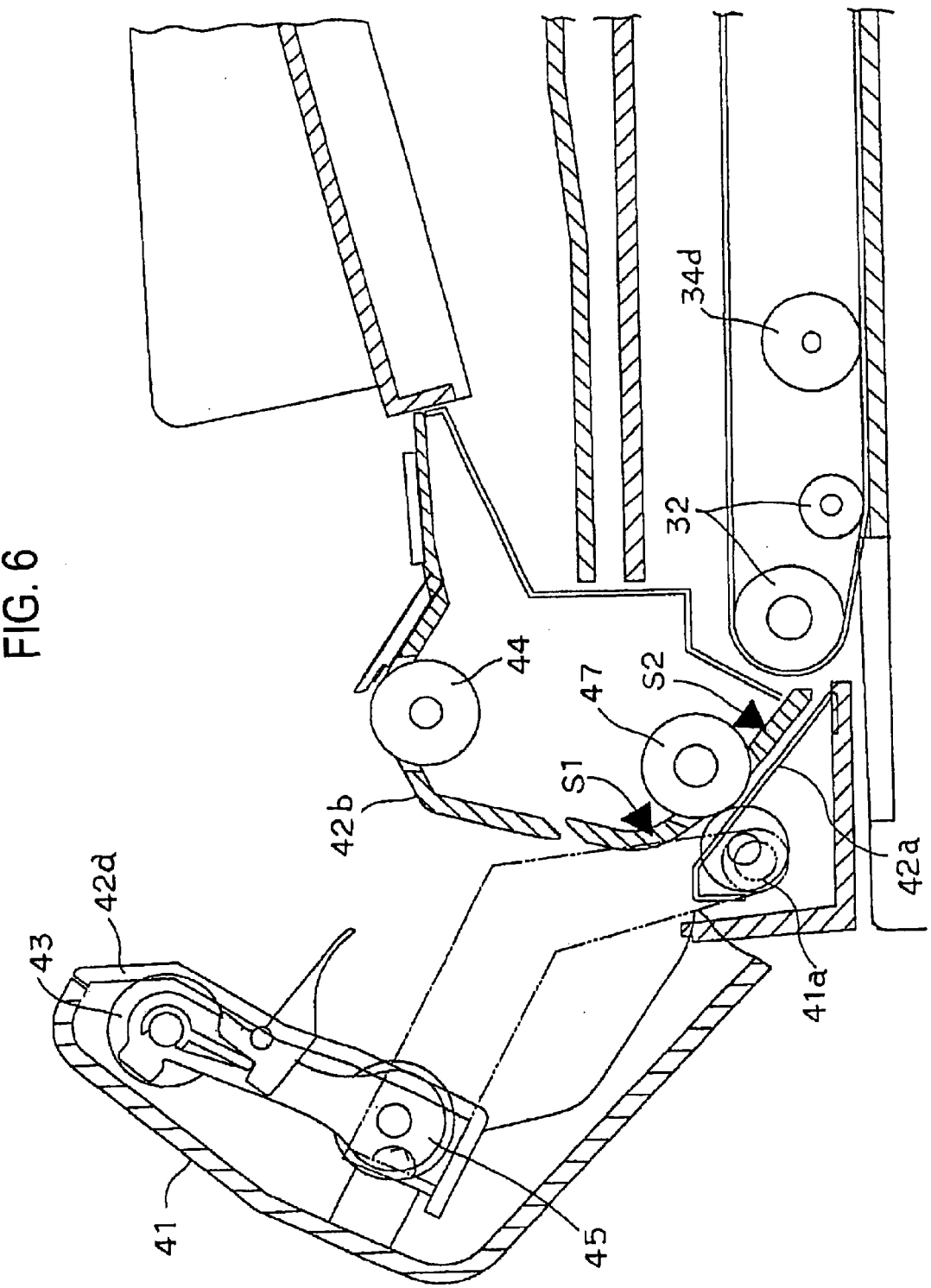
FIG. 6 is a sectional view showing a state that a sheet supply unit of the present invention opens.

As shown in FIG. 5, the hinge device 80 is provided with a mounting member 91, a support member 92 rotatably linked to the mounting member 91 by a rotating pin 93, and an elastic member 94 mounted between the mounting member 91 and the support member 92 for rotatably urging the support member. The mounting member 91 is mounted to a frame 85 of the image reading apparatus 30 through a fastening member such as a screw. The support frame 2 of the automatic document feeder apparatus 1 is mounted to the support member 92. Through this configuration, the automatic document feeder apparatus 1 can rotate to open and closed with regard to the platen glass 31 mounted on the upper surface of the image reading apparatus 30.

In this way, by mounting the automatic document feeder apparatus 1 to the reinforcing frame 85 of the image reading apparatus 30 via the hinge device 80, deformation of the image reading apparatus 30 due to the load of the automatic document feeder apparatus 1 is eliminated.

The flat support frame 2 is formed by bending an outer circumference thereof into a U-shape, as shown in FIG. 4.

Also, the mounting portions 6 and 7, on which the sheet supply unit 3 and the discharge unit 4 are mounted, are established on both sides that are bent and formed into a U-shape. The sheet supply unit 3 is mounted on the first mounting portion 6 from one surface side (an upper surface side) of the support frame 2, and the discharge unit 4 is mounted on the second mounting portion 7.

The third mounting portion 8, on which the transport unit 5 is mounted, is mounted on the other surface side of the support frame 2 (a lower surface side). The fourth mounting portion 9 is mounted on a rear side of the support frame 2, on which a board P mounted with control circuits including the transport motor M3 and a CPU is disposed.

Furthermore, the support frame 2 is provided with an opening 12a for guiding the original from the sheet supply means to the transport means, and an opening 12b for guiding the original from the transport means to the discharge means.

In this way, the support frame 2 is formed into a U-shape (or a box shape) by bending the outer circumference upward, thereby providing enough strength of the frame.

In mounting the sheet supply unit 3, protruding pins 13 established on the front and rear sides of the mounting portion 6 of one surface of the support frame 2 are fitted in fitting hole 14c established in the side plate 14a on the front side of the sheet supply unit and fitting hole 14d established in the side plate 14b on the rear side, and the fitting means are fixed. Similarly, in mounting the discharge unit 4, protruding pins 15 established on the front and rear sides of the mounting portion 7 on one surface of the support frame 2 are fitted in fitting hole 16c established in the side plate 16a on the front side of the discharge unit 4 and fitting hole 16d established in the side plate 16b on the rear side, and the fitting means are fixed. Also, in the same manner, in mounting the transport unit 5, protruding pins established on the mounting portion 8 on the other side of the support frame 2 engage fitting holes 17 established on the transport unit 5, and the fitting means such as screws are fixed. Each unit can be mounted on a precise position through the engagements of the protruding pins established on the frame and fitting holes established on each of the units.

In this way, by mounting each unit on the support frame 2, the support frame and each unit are formed into a unitized body structure.

The sheet supply unit 3 is composed of a sheet supply cover 41; a draw-out roller 43 for drawing out the original stacked on the sheet supply tray 10; a separating member 44 for separating a plurality of the stacked originals into a single sheet; sheet guides 42a and 42b for guiding the supply of the original; a sheet supply roller 45 for supplying the original; a register sensor S1 for detecting an edge of the original; a pair of register rollers 47; and a timing sensor S2 for controlling the supply of the original.

In the sheet supply unit 3, the separating member 44, a pair of the register rollers 47 and the inner side sheet supply guide 42b are mounted on the side plates 14a and 14b. The sheet supply cover 41 and the outer sheet supply guide 42a are configured so that the sheet supply cover 41 of the staple unit 13 can rotate as a unit with the rotating shaft 41a at downstream of the direction of original transport as a pivot. Also, a reversible sheet supply motor M1 is mounted on one of a pair of the side plates for driving the draw-out roller 43, the sheet supply roller 45 and the resister roller 47, and constitutes the unitized sheet supply unit 3.

Also, the sheet supply path can be opened by opening the sheet supply cover. Through this configuration, it is possible to easily remove the original when jammed, thus the apparatus has superior maintenance and operating characteristics. The sheet supply unit 3 forms a unitized structure fixed to the support frame 2. Therefore, the sheet supply cover 41 does not need to support the unit, and in this structure the sheet supply unit 3 can be opened by rotating.

The discharge unit 4 is composed of a pair of discharge guides 52a and 52b for guiding the original to be discharged; a pair of discharge rollers 53a and 53b for transporting the original to the discharge tray; a discharge sensor S3 for detecting the edges of the original to be discharged; an inverting sensor S4 for detecting an inversion of the original; an inverting roller 55 for turning over the original; a discharge flapper 54 for controlling the original discharge path; an inverting flapper 57 for controlling the original inverting path; and pinch rollers 56a and 56b for pressing the original against the inverting roller. Also, the reversible sheet supply motor M2 for driving the inverting roller 55 and the discharge roller 53 is mounted on one of a pair of the side plates, and constitutes the unitized discharge unit 4.

The discharge unit 4 is arranged on an end of downstream side of the support frame 2 in the original transport direction. A pair of the discharge guides 52a, one of the discharge rollers 53a, the inverting roller 55, the discharge flapper 54, the inverting flapper 57, and the pinch rollers 56a and 56b are mounted on a pair of the side plates 16a and 16b. As shown in FIG. 7, a discharge cover 51 and an outside discharge guide 52a integrated with the discharge cover, are configured to rotate as a single body around a rotating shaft 51a. The discharge cover is formed to be able to rotate. By opening the discharge cover 51, the discharge path and the inverting path can be opened. Through this configuration, it is possible to remove the jammed original easily. The maintenance and operating characteristics are also improved. The discharge unit 4 forms a unitized structure fixed to the support frame 2.

The sheet supply guides 42a and 42b in the sheet supply unit 3 and the discharge guides 52a and 52b in the discharge unit 4 are formed of a plastic, thereby further reducing the weight of the apparatus.

Protruding pins established on the mounting portion 8 on the support frame 2 engage fitting holes 17 in the transport unit 5 to mount the transport unit 5 with screws from under the support frame 2. As shown in FIG. 3, the transport unit 5 is composed of a transport belt 18 trained between the drive roller 32 and the follower roller 33. The transport motor M3 drives the drive roller 32 via gears. Also, to precisely transport the original to the platen glass 31 for a fine reading of the original, a plurality of pressing rollers 34a, 34b, 34c and 34d is established.

Through fixing the transport unit 5 to the support frame 2, the support frame 2 and the transport unit 5 constitute a unitized structure.

The following describes an operation of the automatic document feeder apparatus 1 described above. FIG. 8(a) to FIG. 14(c) shows a state that the automatic document feeder apparatus transports the original.

First, the single side reading mode of the original in the automatic document feeder apparatus will be described with reference to FIG. 8(a) to FIG. 11.

Figure 8A:
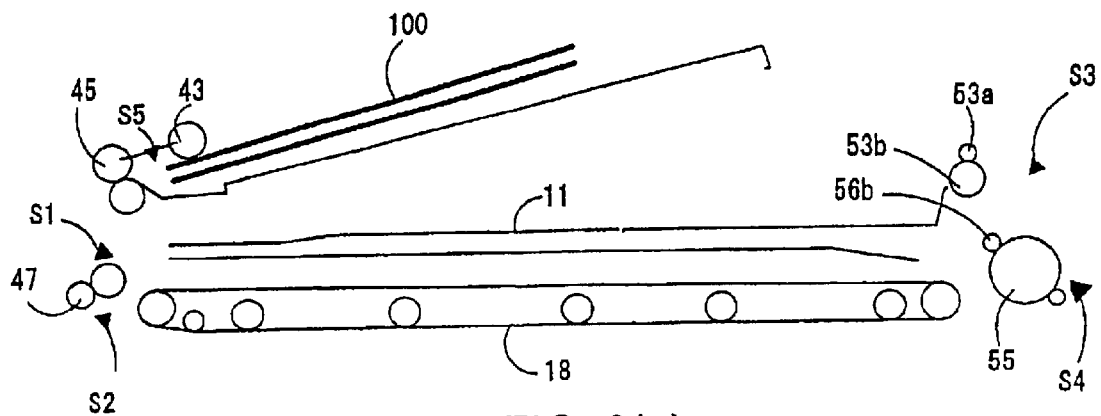
FIGS. 8(a) to 8(c) is a view explaining an operation of reading one side of an original in the automatic document feeder (No.1)

When the original 100 is set on the sheet supply tray 10 (FIG. 8(a)) and the empty sensor S5 detects the original 100, the sheet supply motor M1 rotates forward. This drives the draw-out roller 43 and the sheet supply roller 45. The original 100 is drawn out by the draw-out roller 43, and is separated into a single sheet by the sheet supply roller 45 and the separating member 44 so that the single sheet is supplied. After the leading edge of the supplied original 100 is detected by the resister sensor S1, the sheet supply motor M1 drives by a predetermined amount thereby driving the leading edge of the original 100 to the nip of the register roller 47 to remove any skew of the sheet, then the original stops (FIG. 8(b)). Then, while the sheet supply motor M2 is driven in reverse to rotate the register roller 47 to supply the original toward the platen glass 31, the transport motor M3 drives forward to rotate the transport belt 18 to transport the original 100 fed by the register roller 47 along the platen glass 31 (FIG. 8(c)). After the timing sensor S2 detects the trailing edge of the first original 100, the original is transported by a predetermined amount, then the transport motor M3 stops to stop the register roller and the transport belt 18. Through this process, the original 100 is positioned at a predetermined position on the platen glass 31, and the reading means reads the original 100 (FIG. 9(a)).

At this point, while the first original 100 is being read, if the second original 101 is set on the sheet supply tray 10, that is, if the empty sensor S5 detects the second original 101, the sheet supply motor M1 drives forward to rotate the draw-out roller 43 and the sheet supply roller 45 to draw out the second original 101 in the same way as the first original 100. Then, the second original is separated into a single sheet and stopped to idle after the leading edge of the second sheet 101 touches the nip of the register roller 47 (FIG. 9(b)).

After completing the reading of the first original, the transport motor M3 drives forward again, and at the same time, the discharge motor M2 also rotates forward. Through this step, the transport belt 18 and the inversion roller 55 rotate forward to transport the first original 100 from the platen glass 31 (FIG. 9 (c)).

Here, when the inversion sensor S4 detects the leading edge of the first original 100, the sheet supply motor M1 rotates in reverse to drive the register roller 47. The second original 101, which is nipped and idled at the nipping point of the register roller 47, is controlled to transport toward the platen glass 31. In the same way as the first original 100, the original is transported to the predetermined position on the platen glass 31 and stopped thereat.

Figure 10A:
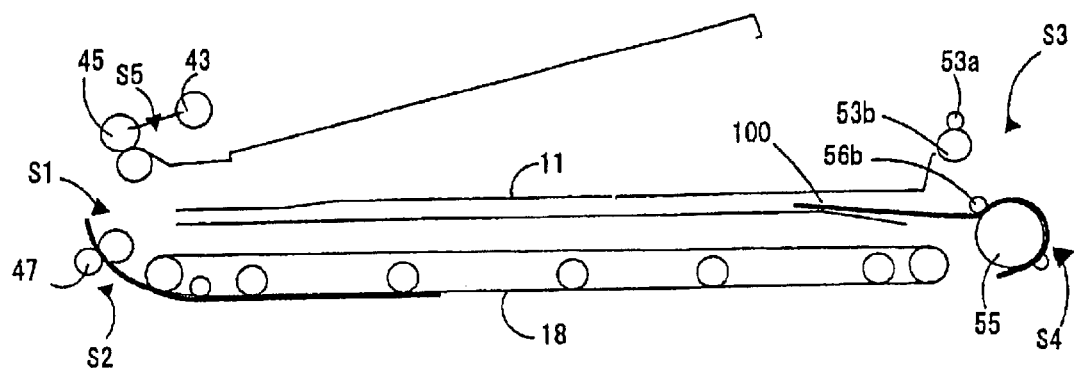
FIGS. 10(a) to 10(c) is a view explaining the operation of reading one side of the original in the automatic document feeder (No.3)
Figure 10B:
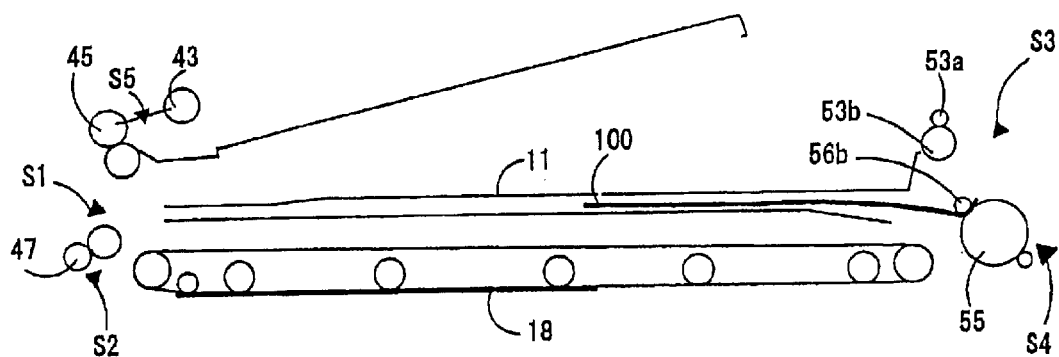
Figure 10C:
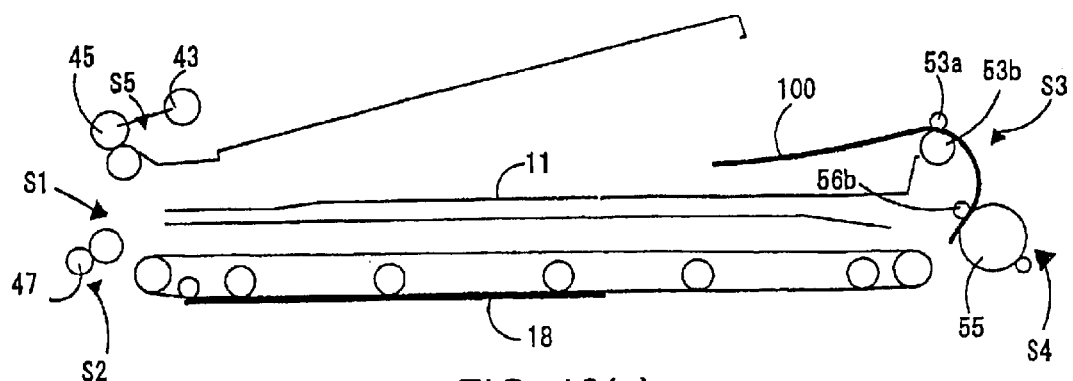
Figure 11:
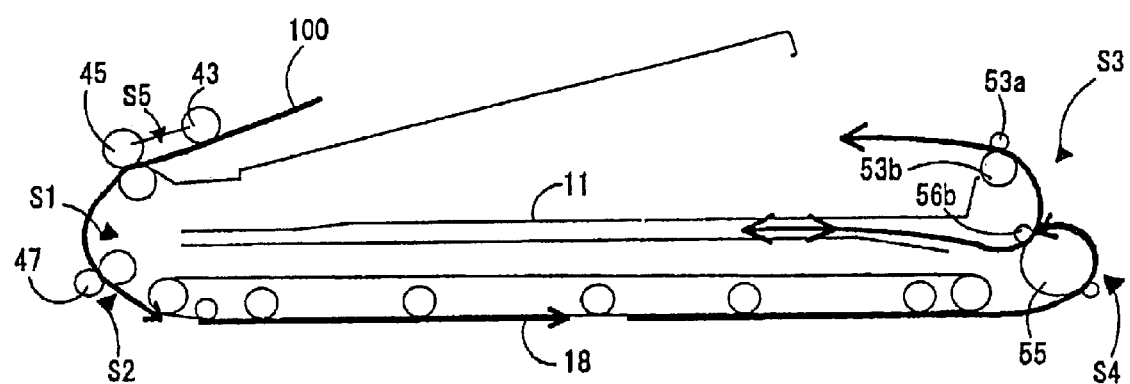
FIG. 11 is a view explaining the operation of reading one side of the original in the automatic document feeder (No.4)

On the other hand, the discharge flapper 54 and the inverting flapper 57 guide the first original 100 transported from the platen glass 31 to the switchback path 25 (FIG. 10(a)) The original 100 is transported by a predetermined distance after the discharge sensor S4 detects the trailing edge of the original, then the discharge motor M3 stops to temporarily stop the inversion roller 55. At this time, at the position beyond the free-falling flapper 60, the trailing edge of the original 100 is nipped by the inversion roller 55 and the pinch roller 56b, and stopped (FIG. 10(b)). Then, the original 100, which is nipped and stopped by the inversion roller 55 and the pinch roller 56b, is switched back by the reverse rotation of the discharge roller M2 and is discharged to the discharge tray 11 by a pair of the discharge rollers 53a and 53b (FIG. 10(c)).

Then, the same operation as the first original 101 is executed for the second original 101. Similarly, the same processes of feeding, transporting and discharging are repeated when the third and fourth originals are in the sheet supply tray 10 (FIG. 11(a)).

Note that the free-falling flapper 60 hangs down with own weight and is configured to rotate upward by the leading edge of the original upon passing therethrough. Also, a drive system is configured such that the discharge roller 53b rotates in one direction regardless of the forward or reverse rotation of the discharge motor M2.

Next, an operation of reading both sides of the original in this automatic document feeder apparatus will be described based upon the FIG. 12(a) to FIG. 14(b).

Figure 8B:
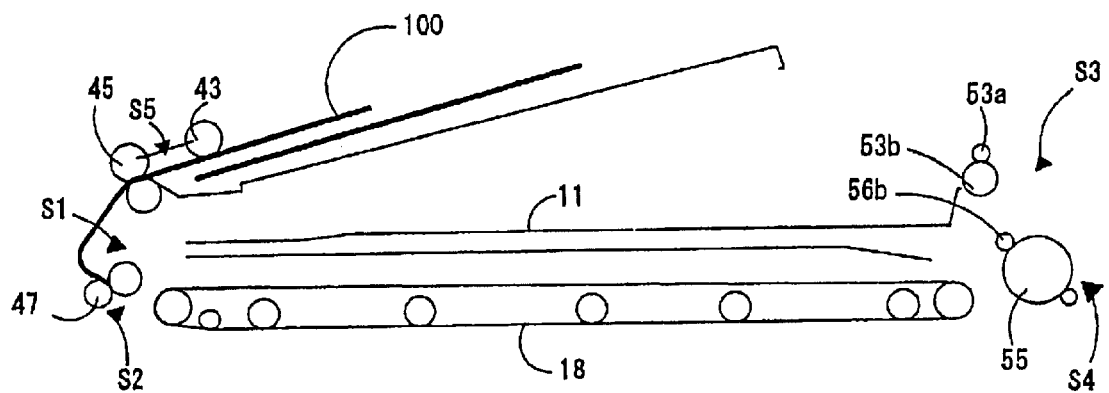
Figure 8C:
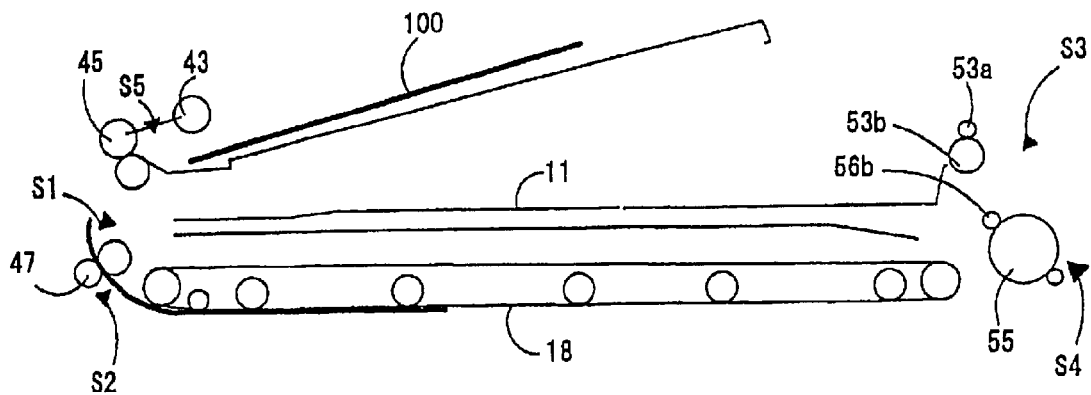
Figure 9A:
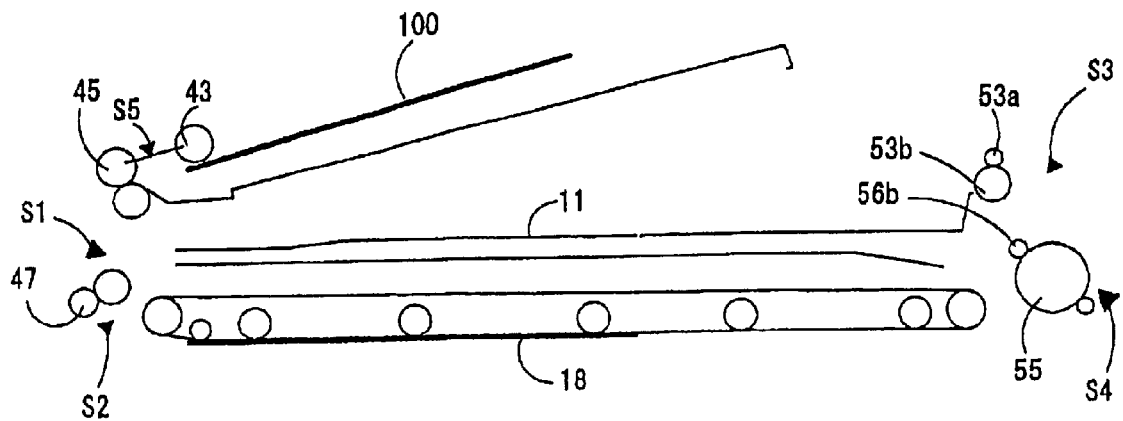
FIGS. 9(a) to 9(c) is a view explaining the operation of reading one side of the original in the automatic document feeder (No.2)
Figure 9B:
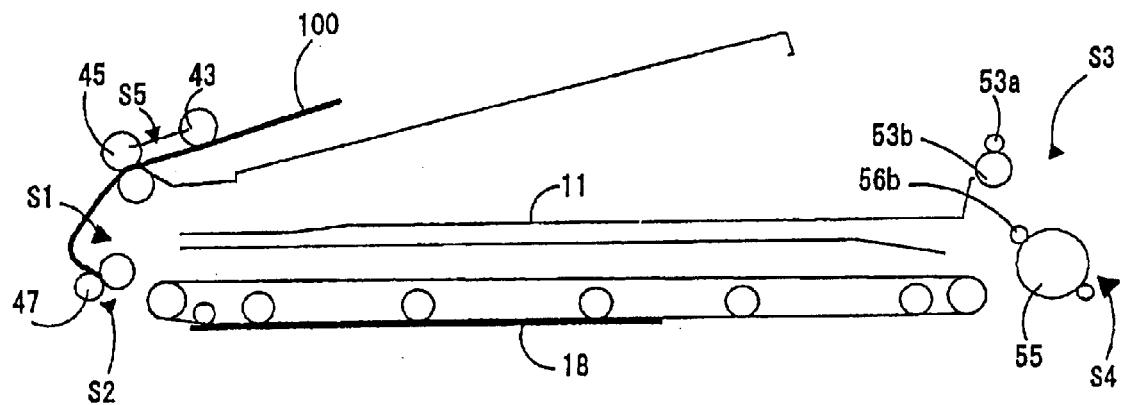
Figure 9C:
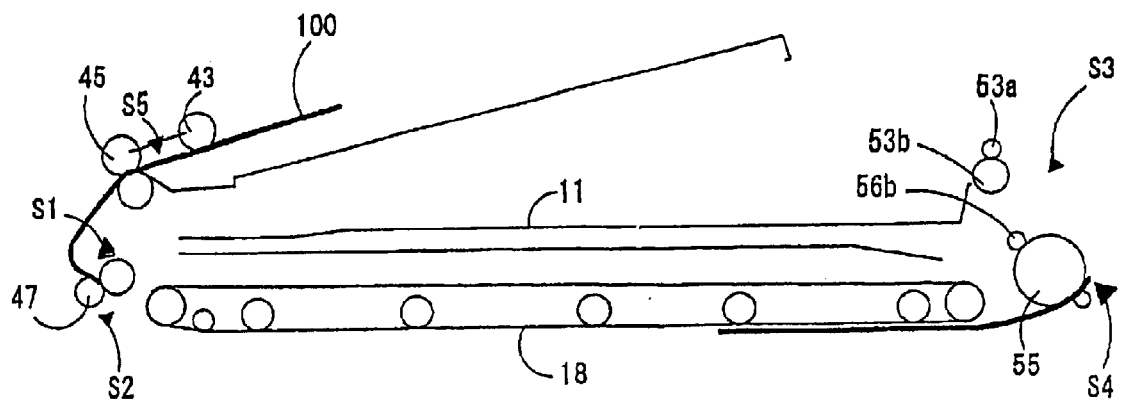

The steps for supplying and transporting the sheet are the same as those in the single side reading mode from supplying the first original 100 to reading the front side (FIG. 8(a) to FIG. 8(b)).

Figure 12A:
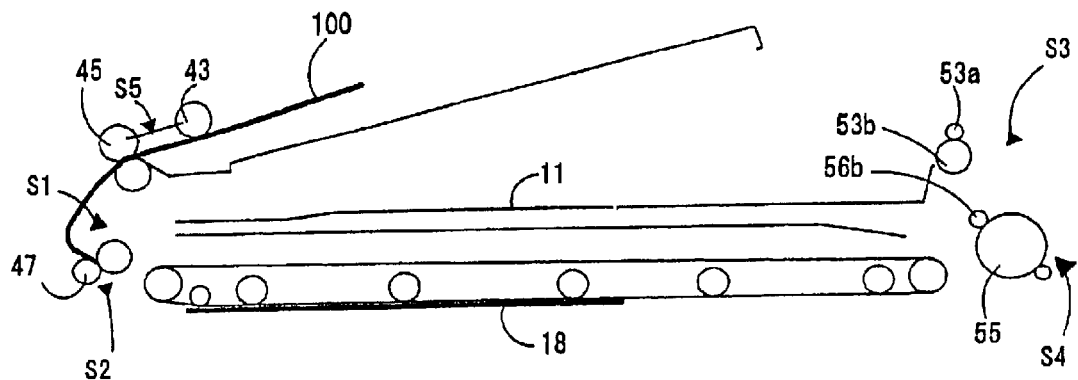
FIGS. 12(a) to 12(c) is a view explaining an operation of reading both sides of an original in the automatic document feeder (No.1)
Figure 12B:
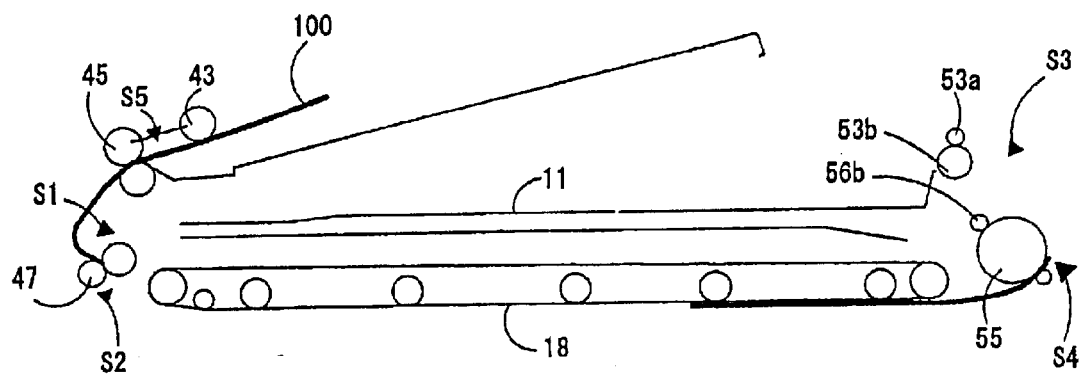
Figure 12C:
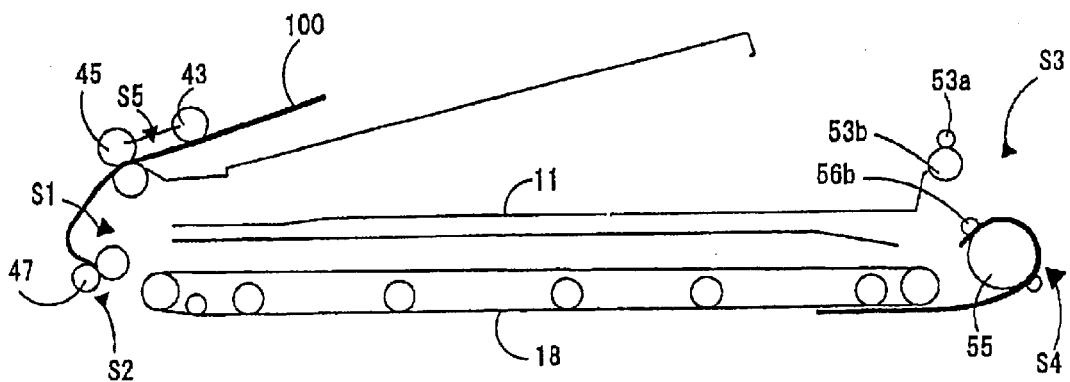

Then, after reading the front side of the first original in the state shown in FIG. 12(a), the first original 100 is discharged from the top of the platen glass 31 by the transport belt 18 and the inversion roller 55 through the forward drive of the transport motor M3 and the forward drive of the discharge motor M2 (FIG. 12(b)).

After the inversion sensor S4 detects the leading edge of the original 100 discharged from the platen glass 31, the transport motor M3 and discharge motor M2 stop temporarily when the leading edge of the original 100 passes the discharge flapper 54 and the free-falling flapper 60 by being transported by a predetermined amount. Then, at a position where the inversion roller 55 and the pinch roller 56b nip the leading edge of the sheet, the transport motor M3 and discharge motor M2 stop temporarily to stop the original 100 (FIG. 12(c)). Then, the transport motor M3 is rotated in reverse at the same time the inversion flapper 57 switches to the direction to guide toward the platen glass 31 again, and the discharge motor M2 again rotates forward. The original 100 is inverted and fed to the platen glass 31 again, and is transported to a predetermined position on the platen glass 31 (FIG. 13(a)).

After the original is transported to the predetermined position and stopped on the platen glass 31, the reading means reads the backside of the original 100. After the reading, the transport motor M3 drives forward and the discharge motor M2 rotates forward simultaneously. Through this process, the transport belt 18 and the inversion roller 55 rotate forward to transport the first original 100 from the platen glass 31 again (FIG. 13(b)).

Here, when the inversion sensor S4 detects the leading edge off the first original, the sheet supply motor M1 rotates in reverse to drive the register roller 47. The second original 101, which is nipped and idled at the nipping point of the register roller 47, is controlled to send toward the platen glass 31. In the same way as the first original 100, the original is transported to the predetermined position on the platen glass 31 and stopped thereat.

When the inversion sensor S4 detects the leading edge of the first original 100 discharged from the platen glass 31, the discharge flapper 54 switches to the position to guide the original 100 directly into a pair of the discharge rollers 53.

Figure 13A:
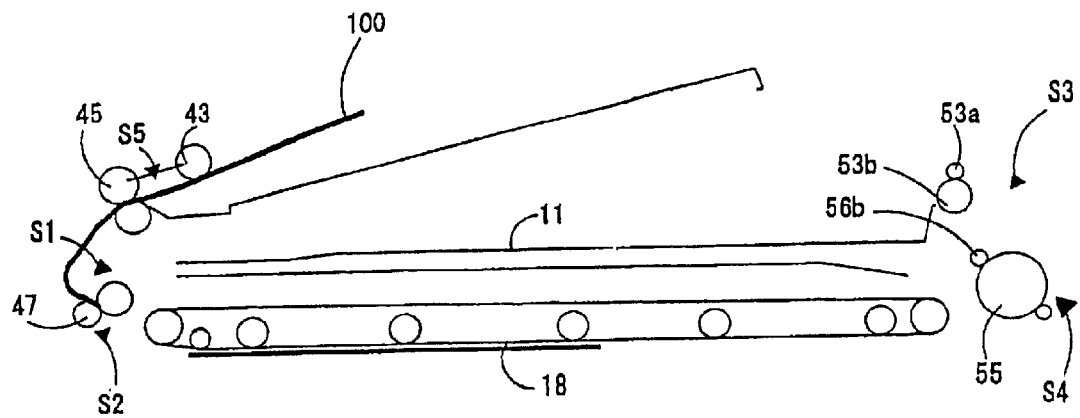
FIGS. 13(a) to 13(c) is a view explaining the operation of reading both sides of the original in the automatic document feeder (No.2)
Figure 13B:
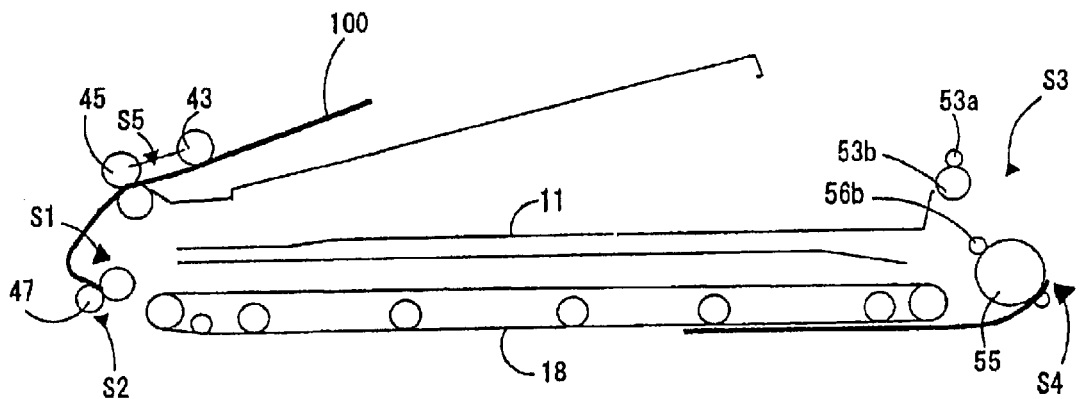
Figure 13C:
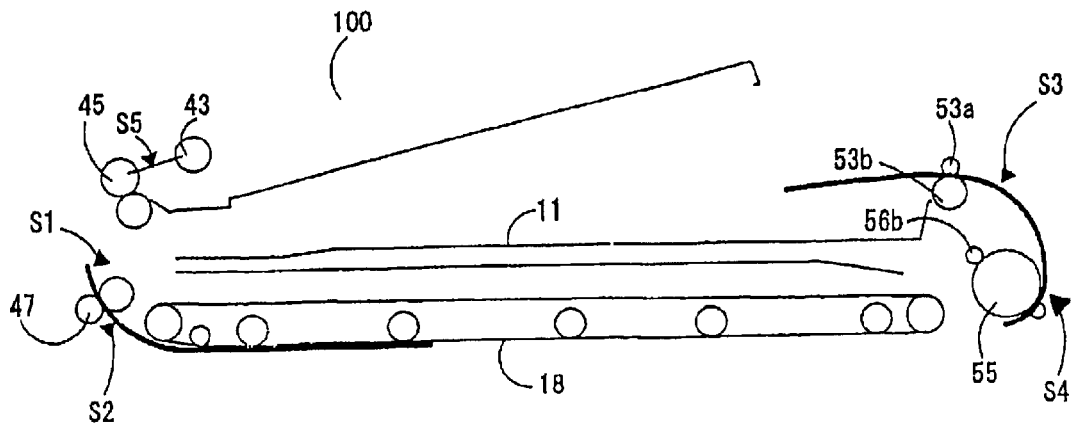
Figure 14A:
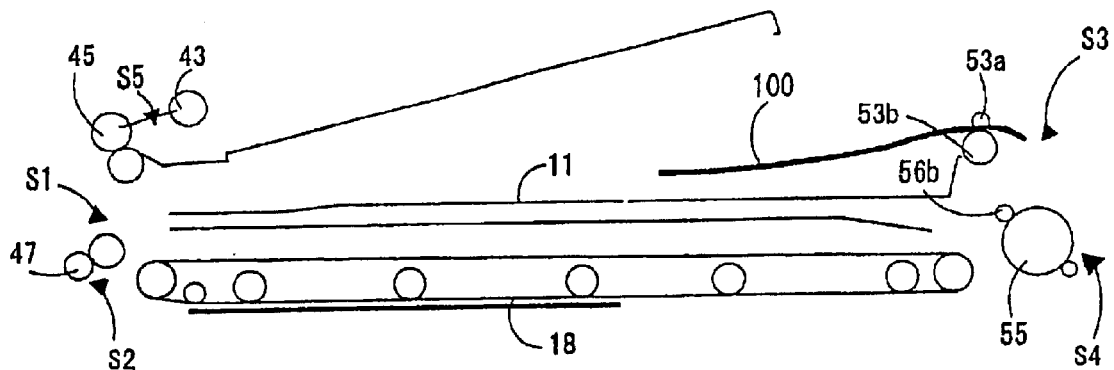
FIGS. 14(a) to 14(b) a view explaining the operation of reading both sides of the original in the automatic document feeder (No.3).
Figure 14B:
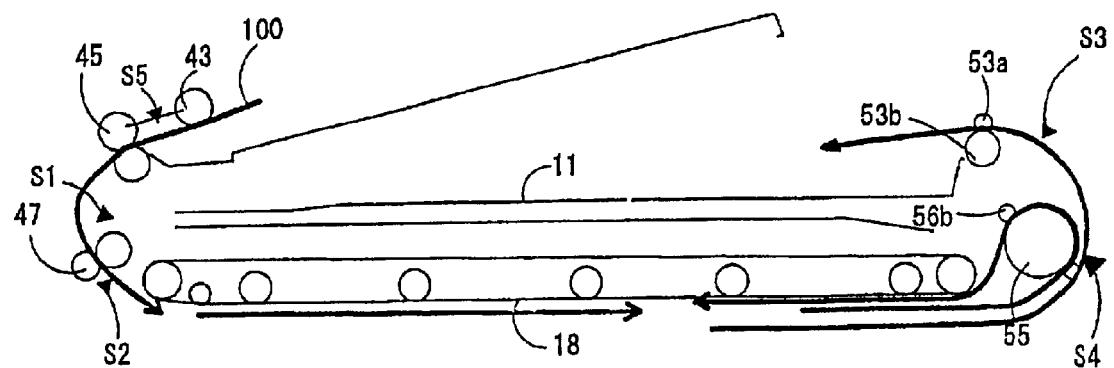

Through this process, a pair of the discharge rollers 53a and 53b discharges the first original 100 to the discharge tray 11 (FIG. 13(c) and FIG. 14(a)).

After that, the same discharging process as the first original 101 is executed for the second original 101. Similarly, the same processes for feeding, transporting and discharging are repeated if the third and fourth originals are in the sheet supply tray 10 (FIG. 13(b)).

As described in detail, according to the embodiment of the present invention, the sheet supply unit and discharge unit are mounted from above to the unitized structured support frame, and the transport unit is mounted from below. Therefore, the structure is light and rigid with no deformation after a long time use. Furthermore, the superior assembly and operating characteristics are achieved, and it is easy to remove the jams and the maintainability is greatly improved.

What is claimed is:

1. An automatic document feeder for supplying an original to a reading position for reading the same and discharging the original read at the reading position, comprising:
   a supply unit including a sheet supply member for supplying the original toward the reading position,
   a transport unit including a transporting member for receiving the original from the sheet supply member and transporting the original to the reading position,
   a discharge unit including a discharge member for discharging the original read at the reading position, and
   one unitary support frame for carrying and supporting the supply, transport and discharge units, said one support frame having a flat plate portion, a sheet supply opening disposed in one lateral side of the flat plate portion for guiding the original from the supply unit to the transport unit, and a sheet discharge opening disposed in the other lateral side of the flat plate portion for guiding the original from the transport unit to the discharge unit, said supply unit and said discharge unit being mounted at the lateral sides on an upper side of the support frame, said transport unit being disposed and mounted on a back side of the flat plate portion between the sheet supply and discharge openings.

2. An automatic document feeder according to claim 1, wherein said support frame with the flat plate portion has a mounting portion having a U-shape at one end thereof, said supply unit being mounted on the mounting portion.

3. An automatic document feeder according to claim 1, wherein said support frame with the flat plate portion has a first mounting portion having a U-shape at one end thereof, to which said supply unit is mounted, and a second mounting portion having a U-shape at the other end thereof, to which said discharge unit is mounted.

4. An automatic document feeder according to claim 3, wherein said support frame with the flat plate portion further includes a third mounting portion for mounting the transport unit and disposed between the first mounting portion with the U-shape and the second mounting portion with the U-shape.

5. An automatic document feeder according to claim 1, wherein drive means is detachably mounted on one of the upper and back sides of the support frame for driving at least one of the sheet supply means, the transport means and the discharge means.

6. An automatic document feeder according to claim 1, wherein said supply unit is provided with drive means for driving the sheet supply member.

7. An automatic document feeder according to claim 1, wherein said discharge unit is provided with discharge drive means for driving the discharge member.

8. An automatic document feeder according to claim 1, wherein said sheet supply unit is provided with first drive means for driving the sheet supply member, and said discharge unit is provided with second drive means for driving the discharge member.

9. An automatic document feeder according to claim 1, wherein said support frame is formed of a plastic.

10. An image reading apparatus comprising the automatic document feeder according to claim 1, and a document reading device for reading the original transported by the document transport device, wherein said document reading device has a platen for reading the original, a reading member for reading the original on the platen, and a document reading device frame for supporting the reading member.

11. An image reading apparatus according to claim 10, wherein said document reading device frame is made of a rigid metal material.

12. An automatic document feeder according to claim 1, wherein said support frame further includes first and second mounting portions for mounting the supply unit and the discharge unit, respectively, said first and second mounting portions being located on said one and the other lateral sides to be located lower than the flat plate portion, said sheet supply opening being located between the first mounting portion and the flat plate portion and said sheet discharge opening being located between the second mounting portion and the flat plate portion.

13. An automatic document feeder according to claim 1, wherein said supply unit includes a plurality of rollers and assembled together as one unit, said transfer unit includes a plurality of rollers and assembled as one unit, and said discharge unit includes a plurality of rollers and assembled as one unit.

14. An automatic document feeder according to claim 12, wherein said support frame further includes a vertical portion surrounding the flat plate portion and first and second mounting portions, and extending substantially perpendicularly to the flat plate portion and first and second mounting portions.

15. An automatic document feeder according to claim 14, wherein said transport unit is retained substantially inside the vertical portion, and is attached to the support frame from the back side, and said supply and discharge units are mounted on the first and second mounting portions from the front side.

* * * * *